United States Patent
Hunt et al.

(10) Patent No.: US 9,769,244 B2
(45) Date of Patent: *Sep. 19, 2017

(54) COURIER NETWORK SERVICE

(71) Applicant: Microsoft Corporation, Redmond, WA (US)

(72) Inventors: Brandon T Hunt, Redmond, WA (US); Alexander Burba, Seattle, WA (US); Andy Hickmott, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 634 days.

This patent is subject to a terminal disclaimer.

(21) Appl. No.: 14/307,581

(22) Filed: Jun. 18, 2014

(65) Prior Publication Data

US 2015/0373086 A1 Dec. 24, 2015

(51) Int. Cl.
*G07F 19/00* (2006.01)
*H04L 29/08* (2006.01)
(Continued)

(52) U.S. Cl.
CPC ............. *H04L 67/10* (2013.01); *G06Q 10/10* (2013.01); *H04L 61/2596* (2013.01)

(58) Field of Classification Search
CPC ................ G07F 19/20; G06Q 20/1085; G06K 7/10881; G06K 7/10851; G06K 17/0022; G06K 7/10772
(Continued)

(56) References Cited

U.S. PATENT DOCUMENTS 7,970,350 B2   6/2011   Sheynman et al.
8,145,532 B2   3/2012   Jones et al.
(Continued)

FOREIGN PATENT DOCUMENTS

WO   2013052163 A1   4/2013
WO   2013171115 A1   11/2013
WO   2014032552 A1   3/2014

OTHER PUBLICATIONS

"International Preliminary Report on Patentability Issued in PCT Application No. PCT/US2015/036110", Mailed Date: Jul. 27, 2016, 9 Pages total.
(Continued)

*Primary Examiner* — Karl D Frech
(74) *Attorney, Agent, or Firm* — Mark K. Young; Mayer & Williams PC

(57) ABSTRACT

Example apparatus facilitate controlling how targeted electronic data is selected and couriered (e.g., physically carried) between a provider in a first physical location and a recipient in a second physical location. An apparatus, method, or service may control the flow of targeted electronic data or metadata concerning the targeted electronic data in a courier network. The service may consider requests for targeted electronic data or information from which targeted electronic data can be identified. The service may also consider predictions about content that a recipient may want. The targeted electronic data may be identified based on a current state of an operating system, an application, or content at the recipient and information about a desired state of the operating system, application, or content. The number and identity of courier devices selected to courier data may be based on a familiarity index between couriers and recipients in the courier network.

47 Claims, 10 Drawing Sheets

(51) Int. Cl.
*H04L 29/12* (2006.01)
*G06Q 10/10* (2012.01)

(58) Field of Classification Search
USPC .... 235/379, 472.01, 472.02, 472.03, 462.45, 235/462.46
See application file for complete search history.

(56) References Cited

U.S. PATENT DOCUMENTS

| | | | |
|---|---|---|---|
| 8,463,842 | B2 | 6/2013 | Ijichi |
| 8,594,632 | B1 | 11/2013 | Azizi et al. |
| 9,232,383 | B1 * | 1/2016 | Burba .................. H04W 4/008 |
| 2002/0060994 | A1 | 5/2002 | Kovacs et al. |
| 2005/0150959 | A1 | 7/2005 | Izzo et al. |
| 2013/0034082 | A1 | 2/2013 | Etemad et al. |
| 2013/0288668 | A1 | 10/2013 | Pragada et al. |
| 2013/0324114 | A1 | 12/2013 | Raghothaman et al. |
| 2014/0010172 | A1 | 1/2014 | Wei et al. |
| 2014/0094119 | A1 | 4/2014 | Stojanovski et al. |
| 2014/0094122 | A1 | 4/2014 | Etemad et al. |

OTHER PUBLICATIONS

Papadopouli, et al., "Effects of Power Conservation, Wireless Coverage and Cooperation on Data Dissemination Among Mobile Devices", In Proceedings of 2nd ACM international symposium on Mobile AD Hoc networking & computing, Oct. 1, 2001, pp. 117-127. (11 pages total).

"Second Written Opinion Issued in PCT Application No. PCT/US2015/036110", Mailed Date: Apr. 28, 2016, (8 Pages total).

"International Search Report & Written Opinion Issued in PCT Application No. PCT/US2015/036110", Mailed Date: Sep. 18, 2015, 12 Pages.

Leister, Wolfgang, "Hikernet Peer-to-Peer Messaging in an Ad-Hoc Network", Published on: Dec. 1, 2004. Available at: http://publications.nr.no/directdownload/publications.nr.no/3999/Leister-Hiker_net.pdf.

Anciaux, et al., "Opportunistic Data Services in Least Developed Countries: Benefits, Challenges and Feasibility Issues", In ACM SIGMOD Record, vol. 43.Issue 1, Mar. 2014, pp. 52-63.

Benchi, et al., "A Message Service for Opportunistic Computing in Disconnected MANET", In Springer Berlin Heidelberg of Distributed Applications and Interoperable Systems, Jun. 13, 2012, pp. 118-131.

Cao, et al., "Routing in Delay/Disruption Tolerant Networks: A Taxonomy, Survey and Challenges", In IEEE Communications Surveys & Tutorials,vol. 15. Issue 2, Apr. 1, 2013. pp. 654-677.

Chen, et al., "Leveraging Social Networks for P2P Content-Based File Sharing in Mobile Ad Hoc Networks". In 8th International Conference on Mobile Adhoc and Sensor Systems. Oct. 17, 2011, pp. 112-121.

Daly, et al., "Social Network Analysis for Routing in Disconnected Delay-Tolerant MANETs", In Proceedings of the 8th ACM International Symposium on Mobile ad hoc Networking and Computing, Sep. 9, 2007, pp. 32-40.

Hossmann, et al., "Social Network Analysis of Human Mobility and Implications for DTN Performance Analysis and Mobility Modeling", In Technical Report of Computer Engineering and Networks Laboratory ETH Zurich. vol. 323, Jul. 2010, pp. 1-12.

Pelusi, et al., "Opportunistic Networking: Data Forwarding in Disconnected Mobile Ad Hoc Networks". In IEEE Communications Magazine. vol. 44, Issue 11, Nov. 1, 2006, pp. 134-141.

Qureshi, et al., "Opportunistic Trust Based P2P Services Framework for Disconnected MANETs". In Springer Berlin Heidelberg of Autonomic and Trusted Computing, Oct. 26, 2010, pp. 154-167.

Wang, et al., "Turning the Postal System into a Generic Digital Communication Mechanism a Project Summary", In ACM SIGCOMM Computer Communication Review. vol. 34, Issue4,. Jan. 8, 2004, pp. 159-166.

Zhuang, et al., "Managing Ad Hoc Networks of Smartphone", In International Journal of Information and Education Technology, vol. 3, Issue 5, Oct. 1, 2013, pp. 540-548.

Woollaston, Victoria, "The App that lets you Chat WITHOUT an Internet or Phone Connection: FireChat uses Hidden iOS Feature to Relay Message", Published on: Mar. 27, 2014, Available at: http://www.dailymail.co.uk/sciencetech/article-2590589/The-app-lets-chat-WITHOUT-internet-phone-connection-FireChat-uses-hidden-iOS-feature-relay-messages.html.

Ramasubramanian, et al., "Secure and Smart Media Sharing Based on Direct Communications among Mobile Devices Underlying in LTE-A Cellular Network", Retrieved on: May 8, 2014, Available at: http://www.tacoma.uw.edu/sites/default/files/global/documents/institute_tech/S_Ramasubramanian.pdf.

Ott, et al., "DTN-Based Content Storage and Retrieval", In Proceedings of the International Symposium on a World of Wireless, Mobile and Multimedia Networks, Jun. 1, 2007, (7 Pages total).

Zhao, et al., "A Message Ferrying Approach for Data Delivery in Sparse Mobile Ad Hoc Networks", In Proceedings of the 5th International Symposium on Mobile Ad Hoc Networking and Computing, Jan. 1, 2004, (12 Pages total).

Ramasubramanian, et al., "Secure and Smart Media Sharing Based on Direct Communications among Mobile Devices Underlying in L TE-A Cellular Network", Retrieved on: May 8, 2014, Available at: http://www.tacoma.uw.edu/sites/defaulUfiles/global/documents/institute_tech/S_Ramasubramanian.pdf (12 pages total).

Woollaston, Victoria, "The App that lets you Chat WITHOUT an Internet or Phone Connection: FireChat uses Hidden iOS Feature to Relay Message", Published on: Mar. 27, 2014, Available at: http://www.dailymail.co.uk/sciencetech/article-2590589/The-app-lets-chat-WITH0UT-internet-phone-connection-FireChat-uses-hidden-iOS-feature-relay-messages.html (22 pages total).

Pentland, et al., "DakNet: Rethinking Connectivity in Developing Nations", In Journal of Computer, IEEE Computer D Society, vol. 37, Issue 1, Jan. 31, 2004, pp. 78-83. (6 pages total).

\* cited by examiner

COURIER NETWORK SERVICE

BACKGROUND

Conventional content distribution systems assume that a device to which content is to be distributed will have an Internet connection. A content provider may therefore configure their content distribution based on the assumption that all requests for content will come directly from the devices to which the content is to be provided. While the requests for content may transit Internet infrastructure, conventional content providers assume that real-time, two-way communications with the content requestor will be available. Thus, conventional content distribution systems may employ sophisticated authentication, authorization, and error checking approaches that rely on real-time, two-way communications. While this model works appropriately for many users, this conventional approach has limited, if any, applicability to a vast number of users of digital devices who do not have consistent, always-on, high-speed, two-way Internet connectivity.

There are approximately 7.2 billion people in the world. There are also approximately 1.5 billion cellular phones and smart phones. For many people, instant-access high-speed real-time connectivity is the norm. For billions of other people, once a day or even once a week email, social media interaction, or other "connectivity" would be revolutionary. Devices (e.g., smart phones, tablets, laptops, computers, game systems) that are able to connect to the Internet seem to be nearly ubiquitous. Whether walking the streets of San Francisco, hiking in the remote high Andes, trekking to parts unknown in Outer Mongolia, sitting in a coffee shop in Seattle, or taking a restful weekend in Amish country in Ohio, there is likely to be a connection enabled device nearby (e.g., in your hand). While devices are nearly ubiquitous, connectivity is not. Connectivity continues to reach deeper into even the farthest corners of the world, but there are still coverage gaps. Popular television commercials in the United States compare coverage maps for various carriers. All the coverage maps reveal significant gaps. In addition to actual gaps, where there is simply no connectivity infrastructure, gaps may be practical or economic, where connectivity is too expensive, too slow, or too insecure to be practically or economically useful.

Since devices are nearly everywhere, and since connectivity is not yet everywhere, devices that are used to communicating frequently with the Internet may be forced to function at a reduced level when connectivity is not available. While this reduced functionality may be inconvenient at times, it may be economically or even physically dangerous at others. For example, not being able to watch the most recent version of a television show may be inconvenient while not being able to receive the most recent update to a map or to receive an urgent weather bulletin may be physically dangerous. Not being able to receive the most recent security update or encryption update may be economically dangerous. Regardless of whether the reduced capability is dangerous or just annoying, the loss of connectivity reduces the utility of mobile devices.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods provide a service that facilitates controlling digital content distribution using a courier network approach. In the courier network approach, an always-on, high-speed, two way Internet connection is not employed for all communications. Instead, a connectionless device-to-device, or device-to-destination approach is employed for at least some communications. Example apparatus and methods provide a service for controlling content distribution in the courier network. While a server may have access to large amounts of storage, a mobile device may have access to smaller amounts of storage, particularly when acting in a courier role. The service may therefore select content to be provided to the mobile device acting as a courier. The selection may be determined by the service's knowledge of the courier device and by the service's knowledge of the recipient devices with which the courier is likely to interact.

In one example, interactions between content providers and the mobile device acting as the courier are examined to identify which content the courier has provided to which recipients. This identification may be used to predict or select content for recipients that the courier is likely to encounter. The identification may be based on requests received from recipients, on knowledge about the state (e.g., operating system loaded, applications used, content acquired) of a recipient, on knowledge about the travel patterns by the courier, or on other information. The identification may then be filtered or altered based, for example, on an account status managed by the service for a courier or recipient (e.g., paid in full, near account limit, overdrawn). The identification may also be filtered or altered based, for example, on a reputation managed by the service for a courier or a recipient (e.g., recipient has never violated license terms, recipient has violated license terms, courier delivers license payments within a desired time frame). The service may be configured to facilitate maximizing different aspects of a courier network. For example, the service may attempt to maximize the utility of a particular courier, may attempt to maximize the utility of a set of couriers, may attempt to maximize the profitability of a courier(s), or may be configured in other ways.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

Furthermore, elements may not be drawn to scale.

DETAILED DESCRIPTION

Figure 1:
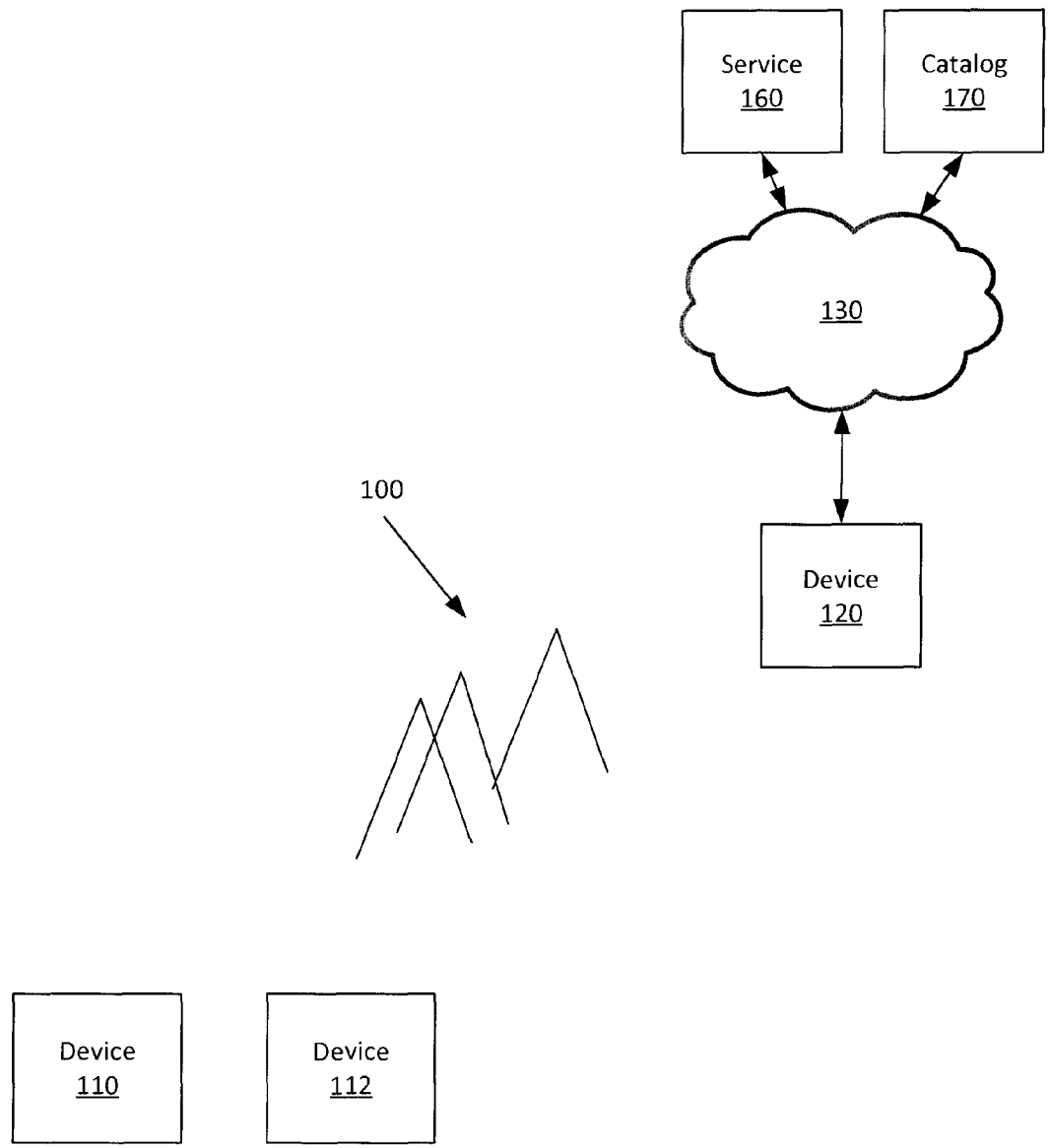
FIG. 1 illustrates a disconnected device and a device that may act as a courier.

Conventional content providers may design digital content delivery systems based on the assumption of always-on, high-speed, low-cost, two-way, Internet-based connectivity between a content requestor and a content provider. However, in many areas and in many situations the assumption may not hold. Delivery may be impossible or impractical due to unavailable, unreliable, insecure, or intermittent connectivity. Delivery may also be impossible or impractical due to factors including unacceptable transfer speeds or costs. While this "last mile problem" may be more prevalent in some locations (e.g., remote regions where it may be a "last hundred mile" problem), the last mile problem is also encountered in locations having the greatest amount of infrastructure, where it may be a "last twenty yards" problem. For example, when a noteworthy event occurs even the most robust infrastructure may be overwhelmed by users of connected devices simultaneously communicating about the event. When a conventional system is overwhelmed, a traditional content delivery model may not work.

Mobile devices (e.g., phones, tablets, laptops, game devices) are widely available and mobile. These devices, being mobile, move around. They move from hand to hand, from room to room, from building to building, from town to town, from country to country, and even from continent to continent in ever changing paths and patterns. These mobile devices have memory that can be used to carry content from location to location, and non-Internet based communication approaches to distribute that content to devices that come within range. The billions of mobile devices that are frequently in motion facilitate providing a courier-based connectivity that employs device-to-device communications. The courier-based connectivity may be used for content distribution instead of Internet-based connectivity. Example apparatus and methods provide a service that facilitates using the courier-based connectivity for intelligent distribution of digital content. The courier-based connectivity may provide a connectionless, intermittent, multi-path approach to distributing content. Example apparatus and methods facilitate identifying content to be distributed, identifying couriers to carry the identified content, and for controlling the flow of content in the courier network.

Device-to-device (D2D) communication is well understood and continues to evolve. For example, near field communication (NFC) has facilitated bump connectivity where two devices that are put in very close proximity can share digital data. D2D connectivity may occur at longer ranges than possible via NFC. For example, WiFi, Bluetooth, or other non-Internet based near range communications may be employed. At any given time, a mobile device may be in D2D range of dozens or even hundreds of mobile devices. This local connectivity phenomenon has been exploited in D2D environments that employ mobile hotspots or other techniques for connecting to the Internet or to create ad hoc local networks where content sharing may be employed.

While D2D has been exploited for certain types of communications and connectivity, the last mile problem, the last hundred mile problem, and the last twenty yards problem still remain and, in some cases are becoming more profound. The opportunities for D2D interactions increase as more and more devices are available and come in contact with other mobile devices. Example apparatus and methods use the phenomenon of mobile devices that travel around to control a courier network to transfer data not just D2D but also device-to-destination or destination-to-device. Example apparatus and methods consider not just the devices that are currently in D2D range at a fixed point in time, but also devices or destinations that a mobile device acting as a courier may encounter. The courier network uses a courier-based physical transportation approach that does not rely on Internet connectivity for transfers.

When being couriered, data may be transferred many miles away hours after being acquired. While conventional content delivery systems that require immediate license payments, immediate checksum verification, or other immediate feedback may not function in the courier network environment, example apparatus and methods accommodate the time between communications when data is physically transported from place to place in a mobile device in a courier network.

A courier based network may be thought of as a mobile device ecosystem. Content (e.g., digital data) or requests for content may enter the mobile device ecosystem via a courier, via a recipient, via a provider, or in other ways. A courier may move around in the ecosystem. When the courier encounters a device, a transfer may occur between the courier and the encountered device. The transfer may flow from the courier to the encountered device or from the encountered device to the courier. The communication may not go through the Internet. The communication may transfer information from which content can be selected by an example service.

By way of illustration, when connected to the Internet or when a content provider is otherwise visible, a courier may receive an update to an application from the content provider. When the courier encounters a device that has that application, the courier may push the update to the encountered device or may make the update available for pulling by the encountered device. The encountered device may interrogate the courier to determine what content, if any, the encountered device wishes to have delivered from the courier. An encountered device may also provide information to the courier about content that the encountered device would like to receive in the future. The courier may then regain connectivity or visibility to the content provider and upload requests for content and download content from the content provider. Before or after regaining connectivity, the courier may move to another location and repeat the process with other encountered devices. Example apparatus and methods provide a service that monitors the interactions between devices in the courier network. Decisions about what content to be carried by a courier may be made based on the information about the monitored interactions.

Courier devices have finite resources. It is impossible to load a courier device with every piece of content that every possible recipient actually needs or might want. Therefore, example apparatus and methods make selections concerning which content to provide to which couriers. The decisions may be based, for example, on specific recipients that the courier is likely to encounter, on classes of recipients that the courier is likely to encounter, on information that a content provider wants as broadly disseminated as possible, on requests from recipient devices for content, or based on other factors.

In one example, an encountered device may in turn encounter other devices that may act as either couriers that provide additional content or that act as encountered devices and that receive content from the encountered device that acts as a courier. In this way, digital content or requests for digital content may be spread throughout the ecosystem during encounters between devices without using the Internet. This may be referred to as, for example, CourierNet or TomasNet (Transfer Over Mobile Apparatus Service). In different examples, the content may be spread organically, may be spread as directed by a service, may be spread under control at the local device level, or may be spread in other ways as the courier devices physically move from place to place and thus physically carry data in their memories from place to place. Example apparatus and methods provide a service that learns content distribution patterns in the mobile device ecosystem. Learning the content distribution patterns may facilitate improving a utility measure for content provision.

Consider a simple courier network scenario where one device acts as a courier and one device acts as a recipient. At some point in time the courier may acquire content that is of interest to the recipient. In different embodiments, the courier may acquire the content at the direction of a service, may acquire the content in response to an earlier request from the recipient, may acquire the content on its own, may acquire the content in response to a direction from a content provider, or may acquire the content for other reasons. When the courier device and the recipient device are close enough to communicate without using the Internet or other long range connections (e.g., cellular), the content may be transferred from the memory of the courier device to the memory of the recipient device. Additionally, a request for content may be transferred from the memory of the recipient device to the memory of the courier device. Example apparatus and methods may receive information concerning the interactions or transfers and may then take actions based on the information. For example, the service may update a user account, the service may update a recipient device reputation, the service may receive and store a receipt for delivered content, the service may record directions to not upload delivered content for the particular recipient, or other actions may be taken. The service considers what content has been delivered, what content may be needed, patterns surrounding requests, provisioning, encounters, and other information about what is happening in the courier network.

In one example, a user may have a laptop computer at a disconnected location (e.g., cabin in the mountains) and may have a mobile device that travels with them "to town" where there is connectivity. The mobile device may be able to carry metadata from the laptop to a location where the mobile device can access an example service. The mobile device may also be able to carry content from a content provider back to the laptop. Which content is provided to the mobile device may be controlled by an example service. An example service may be aware that the laptop computer has a certain version of a certain operating system. When the mobile device is connected to the Internet or otherwise visible to the service, the service may cause an update to the operating system to be provided to the mobile device. The transfer may occur without the laptop or the mobile device having to request the update. In a fully connected model, the laptop may query an operating system website or server periodically as part of a boot process or other maintenance process. But in the disconnected environment where the laptop never connects to the Internet, updates to the operating system were conventionally unavailable. Using the courier network, after the mobile device moves from the acquisition point back to the cabin with the laptop computer, the update to the operating system that was provided under the control of the example service may be transferred to the laptop. When the mobile device is once again connected to the Internet or otherwise visible to the service, the fact of the operating system being updated on the laptop may be reported to the service. The service may then select different content for delivery to the laptop, where the selection is guided by the knowledge of the operating system on the laptop.

While an operating system is mentioned, the content that is transferred may include, but is not limited to, movies, books, web pages, documents, photographs, videos, applications, application patches, application updates, operating systems, operating system updates, security patches, encryption keys, and other information. While a direct transfer from the courier to the recipient is described, in one embodiment the content may transit a series of couriers before reaching the recipient. Also, the courier may provide the content to multiple recipients. An example service may monitor which couriers provide which content to which recipients, may identify patterns, and may then control how content is provided to couriers based on the patterns.

A series (e.g., two) of D2D transfers may be more secure than an Internet communication. Thus, an example service may control how content is provided to a courier and may control how the courier is able to deliver the content to a recipient. The courier may receive the content through a first secure communication then travel to a second location where the courier encounters a recipient device and transfers the digital content to the recipient device through a second secured connection. The service may select this courier network based secure communication over an Internet communication since the sensitive data may be transferred directly from the provider to the courier and directly from the courier to the recipient without being exposed to the Internet. A service may control the distribution of encryption keys, one-time cipher pads, or other data in this fashion.

FIG. 1 illustrates a disconnected device 110, a disconnected device 112, and a connected device 120 that may act as a courier in a courier network. The connected device 120 may be connected to, for example, the Internet 130 or other network or application. Through the Internet 130 or other connections, the device 120 may have access to a service 160, a catalog 170, or other applications or content. The devices 110 and 112 may be separated from the device 120 and the Internet 130 by, for example, a mountain range 100. Thus, the devices 110 and 112 may not have any direct connectivity to the Internet 130, the service 160, or the catalog 170. However, the devices 110 and 112 may still want to acquire digital content.

Consider a village in the Andes. Children in the village may have smart phones and tablets and may like playing a video soccer game. The village may not have Internet connectivity. However, a villager may travel "to town" on a frequent basis (e.g., daily, weekly). If the villager takes a smart phone or other device with them to town, then the villager's device may be able to act as a digital courier in a courier network.

The service 160 may have information about the recipient devices 110 and 112 with which the courier device 120 has interacted. The service 160 may therefore identify a patch, update, or additional data for the devices 110 and 112 and cause this data to be provided to the courier device 120. For example, the service 160 may cause a patch to the video soccer game to be downloaded "in town" from the catalog 170 and brought back to the village by the courier device 120. The courier device 120 will physically carry the patch in its memory as it is physically transported from town, over the mountains, and back to the village. The patch may then be downloaded from the courier device 120 to devices located in the village. The courier device 120 is not acting as a hot spot or distribution point through which a real-time connection is shared, but instead is acting as a temporary repository for requests that are physically carried from village to town or content that is physically carried from town back to the village. This courier based approach resolves the technical issue of providing content to remote locations where Internet or cellular coverage is not available.

The service 160 may be informed later that the content was provided to the devices 110 and 112. The service 160 may then update its knowledge of the recipients, including the state of their devices, their reputation, their account balances, their licensing situation, or other information. Future decisions about content to provide to a courier device may then be made based on the updated information.

Devices in the village may provide explicit requests for the courier device 120 to carry. The service 160 may eventually receive these requests and may cause the requests to be accepted or denied by, for example, the catalog 170. The service 160 may cause the requests to be accepted or denied based, for example, on the account status of a requestor, on the availability of a courier with sufficient resources to deliver the content, on a reputation of a requestor, or based on other factors.

In addition to servicing requests from disconnected devices, the service 160 may also select content that the service 160 predicts may be wanted by devices in the village or elsewhere that the courier device 120 may travel. Thus, the service 160 may control a content provider to push or otherwise make available certain content to the courier device 120 in anticipation of the courier device 120 encountering devices that may want or need the content. The service 160 may also cause the content provider to push or otherwise provide metadata describing a portion or even all of its content. For example, the service 160 may cause metadata describing a portion or even all of the content available in catalog 170 to be placed in the memory of courier device 120.

The service 160 may track interactions between the courier device 120 and the catalog 170, between recipient devices (e.g., 110, 112) and the catalog 170, between recipient devices (e.g., 110, 112) and the courier device 120, or other interactions. The service 160 may then predict which content ought to be provided to device 120 based, for example, on the recipient devices that the courier device 120 is likely to encounter or the content that the recipient devices are likely to need or want.

Figure 2:
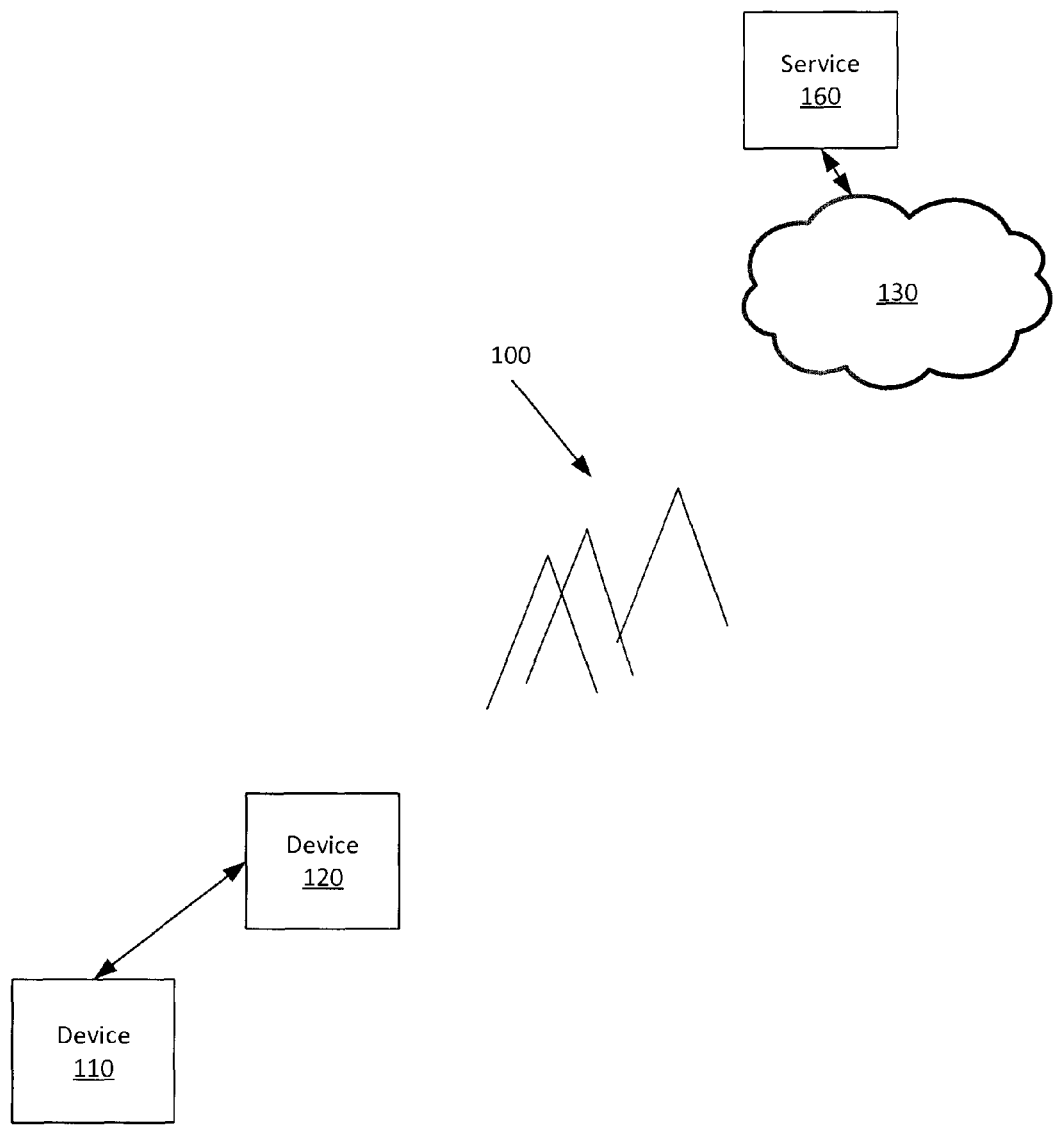
FIG. 2 illustrates a disconnected device and a device acting as a courier.

FIG. 2 illustrates devices in a courier network that is controlled, at least in part, by service 160. A disconnected device 110 and a courier device 120 are interacting after the courier device 120 has come in contact with the disconnected device 110. While device 110 does not have direct, real-time Internet based access to service 160, device 110 has courier network based connectivity to service 160 via device 120. Recall that the disconnected device 110 may be actually disconnected (e.g., no connectivity) or may be practically disconnected because a link available to the Internet 130 is too expensive, not secure enough, too slow, or suffering from other impracticalities. Returning to our Andean example, the courier device 120 may have crossed a high mountain pass on the way from "town", where the Internet 130 was available, to the village where device 110 is located. Device 120 may have content that device 110 requested, that service 160 wanted pushed to device 110, that service 160 predicted device 110 might want, or other content. Device 120 and device 110 may establish communications using a close range mechanism (e.g., NFC, Bluetooth, WiFi) without using the Internet and content may flow from device 120 to device 110. Additionally, requests may flow from device 110 to device 120 to be carried back "to town", or to another location where device 120 may gain access to service 160. This courier approach resolves the technical issue of providing digital updates to devices that do not have real-time access to the Internet.

When the courier device 120 returns "to town" (e.g., to connectivity with the Internet 130), the service 160 may receive information about encounters the courier device 120 experienced, may receive data that was transferred from the courier device 120 to various recipient devices, may receive requests that were transferred to the courier device 120, or other information. The service 160 may also receive information that courier device 120 acquired from other courier devices. For example, courier device 120 may have received information from another courier device that had visited another set of disconnected devices or from another courier device that had visited at least some of the disconnected devices encountered by courier device 120. When courier device 120 next connects to the service 160, this encounter information may be used, for example, to update courier network "connectivity" maps, to queue up content to be provided to couriers, to remove content from a queue for a courier, or for other reasons.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, distributions, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
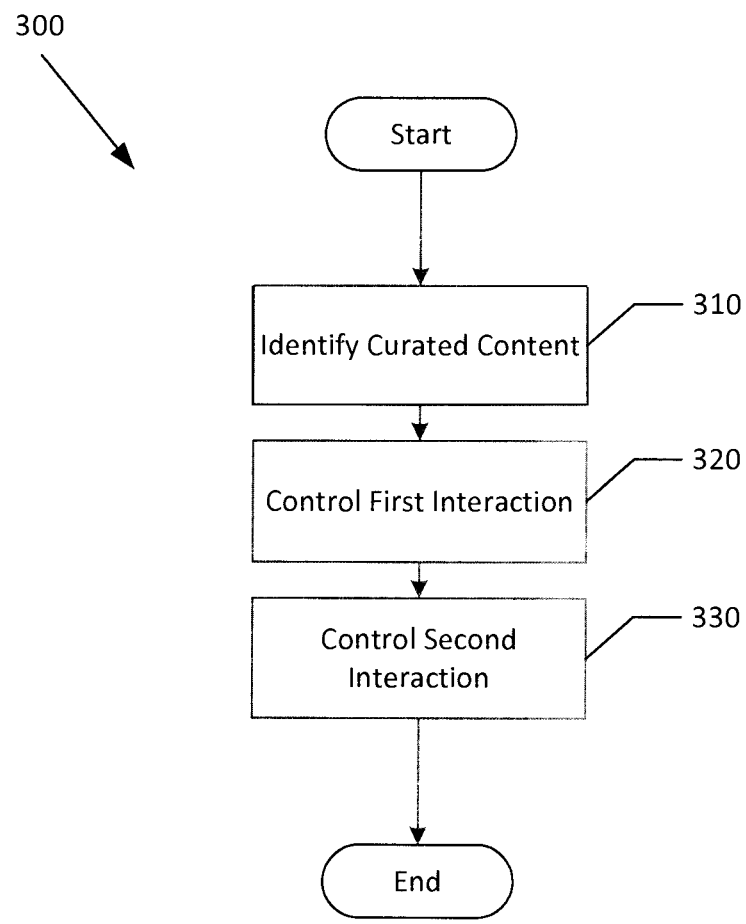
FIG. 3 illustrates a method associated with providing a courier network service.

FIG. 3 illustrates a method 300 associated with providing a courier network service. A courier network employs courier devices (e.g., smart phones, tablets) to physically transport content from a first device (e.g., content provider server) to a second device (e.g., desktop computer). The content is stored in the memory of the courier device and transferred from the courier device to the recipient device using, for example, a non-Internet based communication channel (e.g., NFC, WiFi). Method 300 is performed by an apparatus other than the courier device or the data recipient.

Method 300 includes, at 310, identifying curated electronic data to be couriered between a data provider and a data recipient by a courier device in a courier network. Being "curated" means that the data has been selected by a reviewer, reviewing process, or reviewing apparatus for distribution in the courier network. The curated electronic data may be identified based, at least in part, on what is already in devices in the courier network and on a distribution plan for the courier network. For example, identifying the content to be couriered may include examining state provided by the data recipient, examining state provided by the courier device, or examining state provided by the data provider. The state of the various devices may be examined in light of a distribution plan for the courier network. The state provided by the data recipient, by the courier apparatus, or by the data provider may identify an operating system on the data recipient, an application on the data recipient, or a piece of data on the data recipient.

The distribution plan describes facts including a current distribution of content in the courier network, a desired distribution of content in the courier network, a predicted distribution of content in the courier network, or a distribution urgency for selected content in the courier network. The predicted distribution may account for content that has already been provided to courier devices that are moving around in the courier network ecosystem. The distribution urgency may identify how quickly a content provider or the method 300 would like the content to be distributed. By way of illustration, for a critical security patch for an operating system the distribution urgency may be very high, which may cause method 300 to select a larger number of courier devices to carry the content. But for an incremental update to a piece of content (e.g., weekly tabloid newspaper) the distribution urgency may be lower and a smaller number of courier devices may be selected to carry the content.

Examining the state of recipient devices facilitates identifying updates or replacements that the recipient may want, need, or be interested in. Thus, identifying the curated electronic data may include identifying an update to the operating system, identifying a replacement to the operating system, identifying an update to the application, identifying a replacement for the application, identifying an update to the piece of data, or identifying derivative data based on the piece of data.

Method 300 also includes, at 320, controlling a first electronic interaction between the courier device and the data provider. The first electronic interaction may occur at a first time using a first communication path while the courier device is located in a first location. The first electronic interaction selectively transfers the curated electronic data from the data provider to the courier device. For example, the first electronic communication may transfer a sequel to a movie (e.g., Rocky II) to be transferred to the courier device. Controlling the first electronic interaction may include selecting a communication channel that is available between the content provider and the courier device. The communication channel may be selected based on factors including, for example, how long it will take to transfer the content, how much it will cost to transfer the content, how secure the transfer will be, and other factors.

Method 300 also includes, at 330, controlling a second electronic interaction between the courier device and the data recipient. The second electronic interaction occurs at a second later time using a second different communication path while the courier device is located in a second different location. The second electronic interaction selectively transfers the curated electronic data from the courier device to the data recipient. For example, the second electronic interaction may transfer the movie sequel from the courier device to the data recipient. Controlling the second electronic interaction may include selecting a communication channel that is available between the courier device and the data recipient. The communication channel may be selected based on factors including, for example, how long it will take to transfer the content, how much it will cost to transfer the content, how secure the transfer will be, and other factors.

In a courier network, the courier device physically travels from location to location. Thus, the first electronic interaction and second electronic interaction are performed independently and are separated by a period of time. For example, the two interactions may occur at least one minute apart, at least an hour apart, at least a day apart, or even longer apart. Since the courier device physically travels from place to place, the first location may be at least one kilometer from the second location, at least ten kilometers from the second location, or even farther apart. While there may be a single first interaction to load a particular piece of content (e.g., security patch) into the courier device, there may be multiple second interactions as the content is provided to multiple data recipients.

Figure 4:
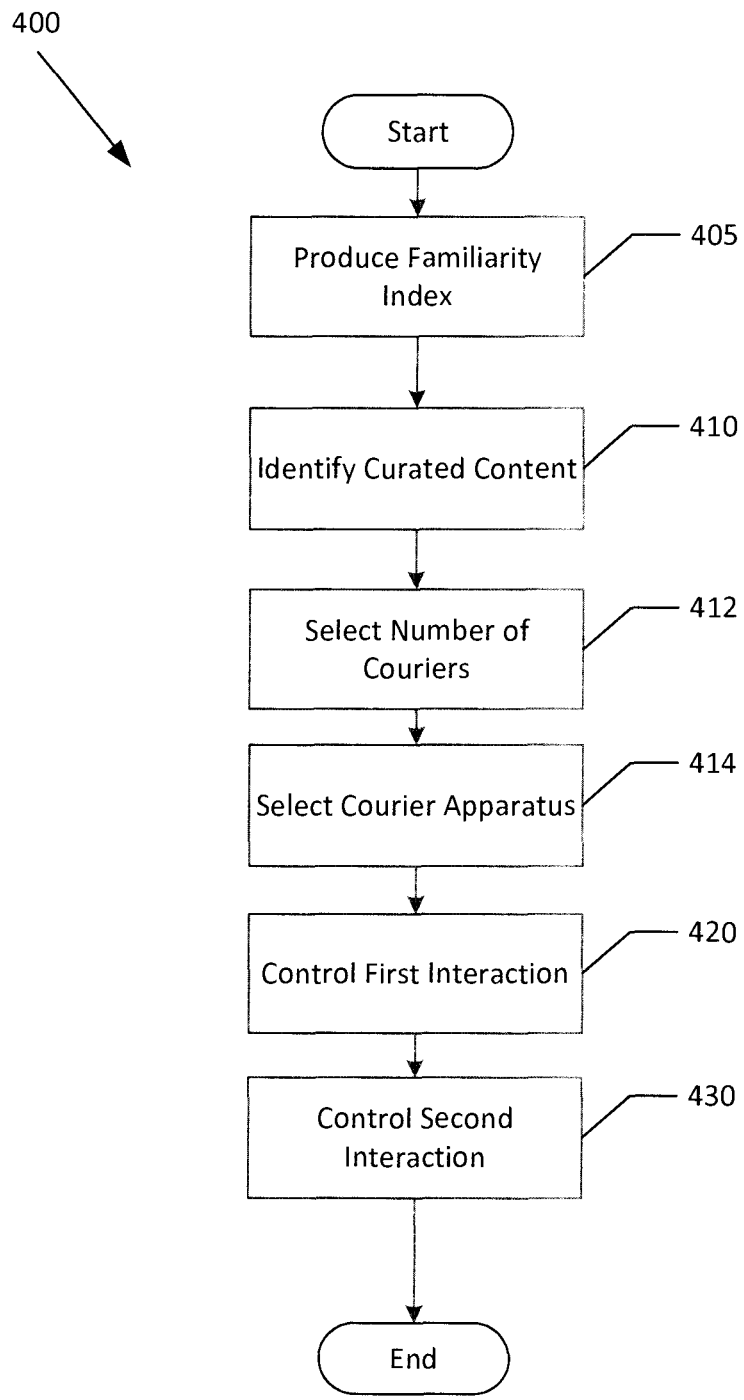
FIG. 4 illustrates a method associated with providing a courier network service.

FIG. 4 illustrates a method 400 associated with providing a courier network service. Method 400 includes several actions similar to those described in connection with method 300. For example, method 400 includes identifying content at 410, controlling a first interaction at 420, and controlling a second interaction at 430. Method 400 also includes additional actions. For example, method 400 includes, at 405, producing a familiarity index that describes interactions between data recipients, data providers, and courier devices that use the courier network. For example, the familiarity index may describe how often a data recipient interacts with a courier device, how much data is transferred from a courier device to a data recipient, and what type of data is transferred from a courier device to a data recipient. Understanding which devices interact in which ways facilitates matching content and couriers to increase the likelihood that content that is wanted or needed by a data recipient device is available to the data recipient.

Method 400 also includes, at 412, selecting a number of courier apparatus to which the curated electronic data is to be provided based on the familiarity index and the distribution plan. For example, the familiarity index may identify that twenty courier devices regularly visit a location where a particular data recipient is located. The content provider may have a low urgency piece of content to deliver. In this case, three courier apparatus may be selected to carry the same content based on the idea that one of the three is likely going to come in contact with the data recipient within a desired period of time. In another example, the familiarity index may identify that only one courier apparatus ever comes in contact with a set of data recipients. In this case, content for that set of data recipients may only be provided to that one courier apparatus. The familiarity index is used to increase the utility of the courier network by providing appropriate content to appropriate couriers for delivery that satisfies a distribution plan.

Thus, method 400 also includes, at 414, selecting which courier apparatus are to distribute the curated electronic data based, at least in part, on the familiarity index and the distribution plan.

In one embodiment, the curated electronic data may be selected at 410 based on a reputation, a licensing situation, or an account situation. For example, a reputation of a courier device may indicate what percentage of content provided to the courier device is actually ever provided to a recipient. A reputation associated with a data recipient may indicate how frequently a data recipient actually acquires and pays for content that the data recipient requested or for content that was predictively put into the courier network for the data recipient to encounter. Content may be selected based on those reputations.

Content may also be selected based on license parameters. For example, a license parameter associated with a courier device may allow the courier device to carry certain types of content (e.g., movies) but not other types of content (e.g., video games). A license parameter associated with a data recipient may identify whether the recipient is allowed to download a specific piece of content (e.g. movie sequel). There is no point selecting content for a courier device that the courier device is not allowed to carry and for which no data recipient that the courier device is likely to encounter is licensed to acquire.

Content may also be selected based on account parameters. For example, an account parameter associated with a courier device may indicate that the courier device has a positive payment balance and thus is allowed to acquire more content to distribute for a content provider. However, an account parameter associated with a data recipient may indicate that the data recipient has an overdue payment balance and thus only a small amount of free content may be selected for courier devices that are likely to encounter that data recipient.

While FIGS. 3 and 4 illustrate various actions occurring in serial, it is to be appreciated that various actions illustrated in FIGS. 3 and 4 could occur substantially in parallel. By way of illustration, a first process could identify data, a second process could control first interactions, and a third process could control second interactions. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 300 and 400. While executable instructions associated with the above methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 5:
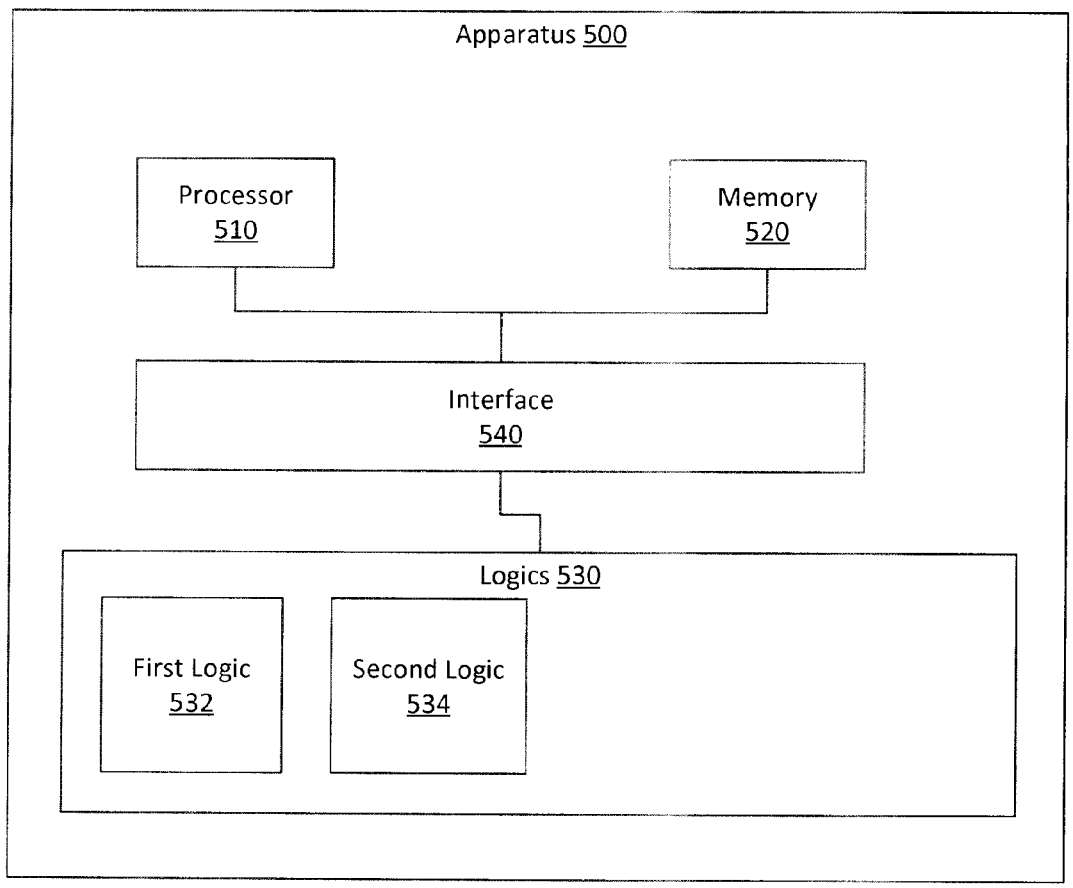
FIG. 5 illustrates an example apparatus associated with providing a courier network service.

FIG. 5 illustrates an apparatus 500 that provides a service for a courier network. The service may control distribution of curated electronic data in the courier network. Apparatus 500 includes a processor 510, a memory 520, a set 530 of logics, and an interface 540 that connects the processor 510, the memory 520, and the set 530 of logics. The processor 510 may be, for example, a microprocessor in a computer, a specially designed circuit, a field-programmable gate array (FPGA), an application specific integrated circuit (ASIC), a processor in a mobile device, a system-on-a-chip, a dual or quad processor, or other computer hardware. Memory 520 may store information for controlling the distribution of the curated electronic data in the courier network. More generally, memory 520 may store information to be distributed by a courier network or information for controlling how to distribute information in a courier network.

In one embodiment, the apparatus 500 may be a general purpose computer that has been transformed into a special purpose computer through the inclusion of the set 530 of logics. Apparatus 500 may interact with other apparatus, processes, and services through, for example, a computer network. Apparatus 500 may be, for example, a computer, a laptop computer, a tablet computer, a personal electronic device, a smart phone, a system-on-a-chip (SoC), or other device that can access and process data.

The set 530 of logics control the distribution of curated electronic data in a courier network. The courier network couriers curated electronic data between a courier apparatus in a first physical location and a recipient apparatus in a second physical location. To "courier" data means that the curated electronic data is physically moved from one physical location to another physical location in the memory of the courier apparatus. A first interaction may move the curated electronic data from a content provider to the memory in the courier apparatus and then a second interaction may move the curated data from the memory of the courier apparatus to a recipient apparatus. The two interactions will occur in different physical locations at different times. The locations may be miles apart and the times may be hours apart.

The first physical location and the second physical location are separated by a threshold distance (e.g., one kilometer, one mile, ten miles). The courier will receive the curated electronic data at the first location (e.g., Cusco) from a first device (e.g., content server) as directed by the apparatus 500 or service. The courier will then store the curated electronic data in its memory and be physically relocated to a second location (e.g., Llactapata). The courier device will then selectively provide the curated electronic data to a second device (e.g., kid's tablet). The service may maintain information about the state of a request/response that may take days to complete. The service may also maintain information about the state of a request/response interaction that takes multiple iterations of communications from the content provider to the courier device, the courier device to the recipient device, the recipient device to the courier device, and the courier device back to the content provider.

The set 530 of logics may include a first logic 532 that identifies the curated electronic data. The curated electronic data may be, for example, an operating system, an operating system update, an application, an application update, a piece of content, an update to a piece of content, or an encryption key. Being "curated" means that the content has been selected by a reviewer, reviewing process, or reviewing apparatus for inclusion in the content distribution service provided by apparatus 500.

The first logic 532 identifies the curated electronic data based on information about the recipient apparatus. The information about the recipient apparatus may have originated in the recipient apparatus and may describe the state of the recipient apparatus (e.g., content currently stored). The information about the recipient apparatus may also be a request provided by the recipient apparatus (e.g., request for additional content), a notice of content received by the recipient apparatus, or a license parameter associated with the recipient apparatus. The notice of content received by the recipient apparatus may be used by apparatus 500 to prevent sending the same content out on another courier device or to identify upgrades, patches, or derivative content to provide on other courier devices. Derivative content may be, for example, additional information associated with previously acquired content. For example, an additional virtual battlefield for a video game would be derivative content for the video game.

The state of the recipient apparatus is not examined in a vacuum. For example, the first logic 532 may identify the curated electronic data based, at least in part, on the state of the recipient apparatus as compared to a desired state for the recipient apparatus. By way of illustration, if the recipient apparatus has version 1.1 of an operating system and version 1.2 is available, then the curated electronic data selected for the recipient apparatus may include the upgrade to version 1.2, but also applications that work on version 1.1 in case the data recipient declines to upgrade.

The information about the recipient apparatus may also have originated in a courier apparatus. This information may also describe a partial or complete state of the recipient apparatus (e.g., current content), a request provided by the recipient apparatus, a notice of content received by the recipient apparatus, a license parameter associated with the recipient apparatus, or other information. The courier apparatus may know the state of the recipient apparatus by tracking data that the courier apparatus has provided to the recipient apparatus.

The information about the recipient apparatus may also have originated in the apparatus 500 itself. This information may describe an account parameter associated with the recipient apparatus, a reputation parameter associated with the recipient apparatus, a license parameter associated with the recipient apparatus, or other information (e.g., content previously sent to the recipient apparatus using the courier network). The account parameter may indicate whether the recipient apparatus has a credit balance or debit balance in their account. The reputation parameter may identify a payment history for the data recipient. The license parameter may identify whether the data recipient has violated any license terms. Thus, the curated electronic data may be selected based not just on what the data recipient has, what the data recipient wants, or what the data recipient could benefit from, but also based on information about the data recipient's interactions with the courier network and content provider.

The first logic 532 may identify the curated electronic data based on information transferred in two or more request/response iterations between the recipient apparatus and the content provider. A request/response iteration involves couriering a request from the recipient apparatus to the content provider apparatus and couriering a response from the content provider to the recipient apparatus. Since multiple request/response iterations may be involved, the first logic 532 may need to maintain information about a multi-step communication until the communication can be completed.

In one embodiment, the first logic 532 identifies the curated electronic data based on a prediction of content that will satisfy a utility measure for the recipient apparatus. The utility measure may balance the degree to which a recipient wants the content, the degree to which the recipient needs the content, and the degree in which the recipient can actually use the content. By way of illustration, a recipient may have asked for a certain piece of content ten times and may have even offered a premium to receive the content. This may indicate the degree to which the recipient wants the content. The content that the recipient really wants may be, for example, the next episode in a television series. The apparatus 500 may know that the recipient is missing a critical security update for an operating system and is missing a useful upgrade to a productivity application. The recipient may also have an older version of a video display program, and the requested content may be best viewed using a newer version of the video display program. Thus, the utility measure may consider all these factors to determine whether to provide the content to a courier device that is likely to encounter the recipient.

The prediction may be based, at least in part, on a state of the recipient apparatus. The state may identify content that is currently on the recipient apparatus or may identify content that has already been dispatched to the courier network using courier apparatus that are likely to interact with the recipient. The prediction may also be based, at least in part, on an analysis of the state of the recipient apparatus made by a recommendation system. A recommendation system may provide recommendations of the form "if you have this, then you might like this".

The prediction may also be based on what users other than the data recipient are doing. For example, the prediction may be based, at least in part, on content that was acquired from the courier apparatus by other recipient apparatus within a threshold period of time. Thus, the prediction may consider what other users are acquiring from other couriers. This may identify content that is "hot" or "trending." Additionally, the prediction may be based on content that was acquired from the content provider within a threshold period of time. This may further identify what is hot or trending. Data recipients may only be able to acquire data that is available in courier devices. However, content may arrive in the content provider after a courier device has left the first location. Thus, in one embodiment, the prediction may be based on content that has been acquired by the content provider since a previous interaction with the content recipient.

The set 530 of logics may also include a second logic 534 that controls the distribution of the curated electronic data in the courier network. Since the courier network involves the physical transportation of content from place to place in the memory of a courier device, communications from provider to recipient are not instantaneous. Thus, the first logic 532 may provide an estimated delivery time for the curated electronic data or an estimated delivery cost for the curated electronic data. The second logic 534 may therefore selectively control whether or how the curated electronic data is distributed based, at least in part, on the estimated delivery time or the estimated delivery cost.

In one embodiment, the first logic 532 assigns an expiration time to the curated electronic data. In this embodiment, the second logic 534 controls the distribution of the curated electronic data based, at least in part, on the expiration time. For example, upon determining that the expiration time has passed, the second logic 534 selectively causes the curated electronic data to be deleted from the memory of the courier apparatus or selectively prevents the curated electronic data from being distributed by the courier apparatus.

In one embodiment, upon determining that the targeted electronic data has already been received by an intended recipient apparatus, the second logic 532 selectively causes the targeted electronic data to be deleted from the memory of the courier apparatus. For example, the second logic may send a "delete content X" message to the courier apparatus. The second logic 532 may make the determination that the targeted electronic data has already been received by examining the state of the recipient apparatus, by examining a content received receipt from the recipient apparatus, or in other ways. The content received receipt may describe when content was delivered, which courier apparatus delivered the content, an amount paid for the content, or other information.

A courier network may have multiple courier apparatus available to help distribute curated electronic data. Thus, in one embodiment, the second logic 534 controls the distribution of the curated electronic data by selecting a selected courier apparatus to which the curated electronic data will be provided. The second logic 534 may select one or more courier apparatus to carry curated electronic data. The second logic 534 may select the selected courier apparatus based on different factors. In one embodiment, the second logic 534 may select a courier apparatus based on a cost associated with couriering the curated electronic data in the selected courier apparatus. For example, the courier apparatus with the lowest cost or that may generate the highest profit may be selected. In one embodiment, the second logic 534 may select a courier apparatus based on a security associated with couriering the curated electronic data in the selected courier apparatus. For example, a highly sensitive piece of data (e.g., encryption key, cipher pad, product activation key) may be sent using a courier apparatus with a higher level of security while a less sensitive piece of data (e.g., advertisement), may be sent using a courier apparatus with a lower level of security. The second logic 534 may select a courier apparatus based on an expected delivery time associated with couriering the curated electronic data in the selected courier apparatus. For example, courier apparatus that are likely to deliver the data within a desired time frame may be selected.

Courier apparatus have finite resources. Also, there may be a finite number of courier apparatus. Thus, in one embodiment, the second logic 534 may select how many courier apparatus will carry the data based, at least in part, on a number of courier apparatus that have already been provided with the curated electronic data. For example, if more than a threshold number of courier apparatus have already been provided with the curated electronic data, only one more courier may be selected, while if less than a threshold number of courier apparatus have been provided with the data, a plurality of courier apparatus may be selected. In one embodiment, the number of courier apparatus to which the curated electronic data will be provided may be a function of an urgency measure associated with the curated electronic data or on a breadth of distribution measure associated with the curated electronic data. For example, if some data needs to be distributed as widely as possible, then a larger number of couriers may be selected, but if some other data only needs to be distributed to a few members of the courier network, then a smaller number of couriers may be selected. Similarly, if a certain piece of data needs to be distributed as fast as possible, then a larger number of couriers may be selected while if the data has less urgency then a smaller number of couriers may be selected.

Different communication channels may be available for transferring content from a content provider to a courier apparatus. Similarly, different communication channels may be available for transferring content from a courier apparatus to a data recipient. The channels may have different costs, bandwidth, security, and other attributes. In one embodiment, the second logic 534 controls the distribution of the curated electronic data by selecting a communication channel for providing the curated electronic data from the content provider to the courier apparatus. For example, the second logic 534 may select a communication channel based, at least in part, on an expected completion time associated with transferring the curated electronic data on the communication channel. A channel with a quicker expected completion time may be selected over a channel with a slower expected completion time. Channel selection may be achieved by, for example, establishing values in metadata associated with data, where the metadata describes minimum, maximum, or acceptable ranges for different parameters (e.g., cost, transfer time, security). A combination of factors may be considered. For example, a slower but much less expensive channel may be selected over a faster but much more expensive channel.

The second logic 534 also controls the distribution of the curated electronic data by selecting a communication channel for providing the curated electronic data from the courier apparatus to the recipient apparatus. This channel may also be selected based, at least in part, on a cost associated with transferring the curated electronic data on the communication channel, on a security associated with transferring the curated electronic data on the communication channel, on a bandwidth associated with transferring the curated electronic data on the communication channel, on an expected completion time associated with transferring the curated electronic data on the communication channel, or on a combination of these or other factors.

Different security levels may be available for data communications. For example, a data communication may be encrypted using a variety of different encryption methods or may be manipulated in other ways that produce other levels of security. Thus, the second logic 534 may control a security level associated with transferring the curated electronic data from the content provider to the courier apparatus. Similarly, the second logic 534 may control a security level associated with transferring the curated electronic data from the courier apparatus to the recipient apparatus. Controlling the security level may include, for example, causing content to be encrypted in a certain way.

Mobile devices are, by definition, mobile. Therefore, a potential courier apparatus may be in a location where a content provider could transfer content if the courier apparatus stayed put for a certain period of time. Therefore, in one embodiment, the second logic 534 provides time data to a user of the courier apparatus describing a period of time needed to complete a transfer of targeted electronic content to the courier apparatus. The time data may encourage the user to stay within range of the content provider long enough for the transfer to complete.

The second logic 534 may not accept all requests for content from a data recipient that caused the first logic 532 to identify the requested content. Instead, the second logic 534 may control the distribution of the curated electronic data by selectively causing a request for content from a recipient apparatus to be accepted or denied by the content provider. The acceptance or rejection may be based on factors including an account status associated with the recipient apparatus (e.g., current, overdue, cancelled), on a reputation status associated with the recipient apparatus (e.g., trustworthy, not trustworthy, preferred client), or on information concerning other curated electronic data previously distributed to the courier network (e.g., already sent version 2.1, earlier request for 2.0 denied).

The second logic 534 may control the distribution of the curated electronic data to maximize, minimize, or otherwise improve certain metrics for the courier network. In one embodiment, the second logic 534 may control distribution to maximize profit produced for the content provider. Maximizing profit may include assigning different sets of selected content to different sets of selected courier apparatus that are most likely to encounter recipient apparatus that acquire and pay for the content. In one embodiment, the second logic 534 may control distribution to maximize throughput to the recipient apparatus or to maximize a distribution area for the curated electronic data. For example, the second logic 534 may seek to distribute an important piece of news as quickly and as widely as possible. Thus, content that might get in the way of the important news may be de-selected and a large number of couriers may be selected. In one embodiment, the second logic 534 may seek to minimize a cost for distributing the curated electronic data.

A content provider may have a large catalog of content available to distribute. A courier apparatus may have a finite amount of memory to distribute content. Thus, the second logic 534 may control the distribution of the curated electronic data by deciding whether to provide actual curated electronic data or metadata about the curated electronic data. Some actual data may be distributed and some metadata about other data may be provided. The mix of data and metadata may be determined to reconcile competing demands for content that was actually requested, content that is actually needed, and content that the content provider would like recipients to consider and download. Controlling the mix of data and metadata may be part of maximizing profit or throughput while minimizing cost.

The recipient apparatus and the content provider may be separated by long distances. For example, the recipient apparatus may reside in a village on one side of a high mountain pass and the content provider may reside in a city located on the other side of the mountain pass. Identifying the right information to be carried by the courier apparatus may require more than one interaction (e.g., request/response) between the recipient apparatus and the content provider. Thus, the first logic 532 may identify the curated electronic data based on information transferred in two or more request/response iterations between the recipient apparatus and the content provider. A request/response iteration involves couriering a request from the recipient apparatus to the content provider and couriering a response from the content provider to the recipient apparatus. Recall that couriering involves physically carrying electronic data in a memory from place to place. The requests and responses may travel back and forth in the same courier apparatus or at least one of the requests or responses may travel between the content provider and recipient apparatus in a different courier apparatus.

Identifying and providing curated electronic data may involve two or more iterations of interactions between the recipient apparatus and the service. Consider a request for an upgrade to an operating system or an attempt to push an update to an operating system. The request or push may need to be orchestrated in multiple phases where requests, responses, or state transit multiple devices in multiple sessions (e.g., go from $1^{st}$ courier to $2^{nd}$ courier to $3^{rd}$ courier to internet/catalog then back by $3^{rd}$ courier to $4^{th}$ courier to $5^{th}$ courier). A request may travel to the service by one path and content may be delivered back by a different path using a different courier.

Figure 6:
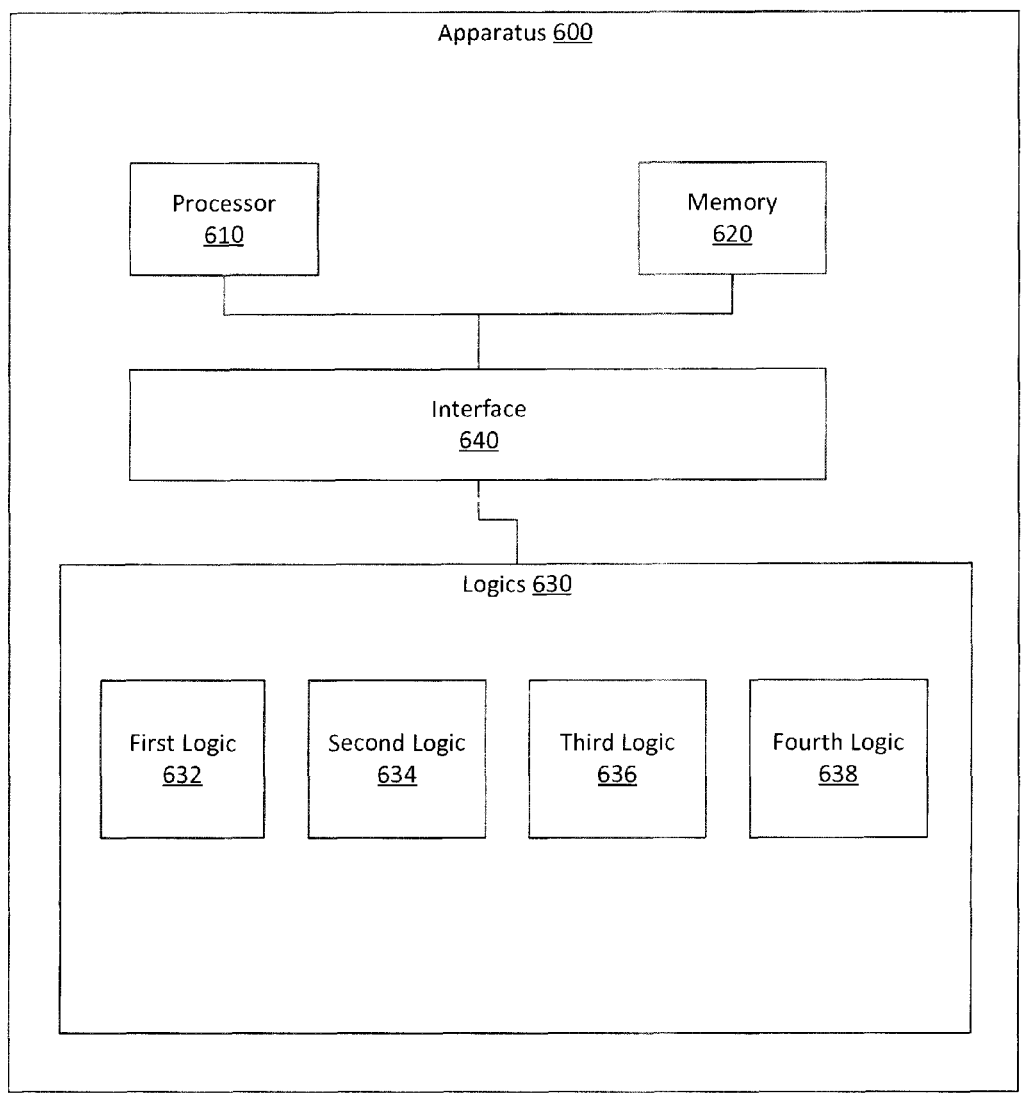
FIG. 6 illustrates an example apparatus associated with providing a courier network service.

FIG. 6 illustrates an apparatus 600 that is similar to apparatus 500 (FIG. 5). For example, apparatus 600 includes a processor 610, a memory 620, and logics 632 and 634 that correspond to the set of logics 530 (FIG. 5). However, different embodiments of apparatus 600 may include additional logics that perform additional functions.

Apparatus 600 also includes an additional third logic 636. Third logic 636 may provide a user interface for the apparatus 600. The user interface may display different information to facilitate understanding or controlling the courier network functionality provided by apparatus 600. For example, the user interface may display a number of courier apparatus available to distribute the curated electronic data and an expected number of courier apparatus available to distribute the curated electronic data. Knowing how many couriers are available may facilitate understanding how long it is going to take to achieve a desired coverage. The user interface may also display information concerning communication channels available to distribute the curated electronic data. Understanding which channels are available may help understanding distribution costs. The user interface may also display a likelihood of an interaction between a certain courier apparatus and a certain recipient apparatus, a number of recipient apparatus likely to be encountered by the courier apparatus, an actual coverage of the courier network by the curated electronic data, or a predicted coverage of the courier network by the curated electronic data. Understanding the likelihoods of interactions and the resulting coverage may facilitate understanding the impact of varying the number of couriers. A user of apparatus 600 may examine the displayed information to determine which actions to take. For example, a user may look at the user interface and see that a favorite courier apparatus is available and that the courier apparatus is likely to encounter a desired set of recipient apparatus. The user may then direct the apparatus to provide the curated electronic data to that recipient. In another example, the user may look at the user interface and see that a recipient has requested certain content but the recipient has not paid their bill and has a bad reputation for violating license agreements. The user may then make a business decision concerning whether to send the requested content via a courier apparatus based on the reputation, license, and account data.

Apparatus 600 also includes a fourth logic 638 that provides a familiarity index. A familiarity index relates one or more courier apparatus in the courier network to one or more recipient apparatus in the courier network. The index may be implemented in different data structures including, for example, an array, a multi-dimensional array, a tree, a set of records, a table, a database, or other data structure. In one embodiment, the familiarity index describes how often a recipient apparatus interacts with a courier apparatus, an amount of data transferred from a courier apparatus to a recipient apparatus, a type of data transferred from a courier apparatus to a recipient apparatus, or other information. Having knowledge about how frequently a courier apparatus interacts with a recipient apparatus facilitates deciding which courier apparatus ought to carry which content that is intended for certain data recipients. Having knowledge about which set of couriers may be required to provide a certain likelihood of a desired distribution or coverage for data also facilitates selecting a number and identity of courier apparatus.

Thus, the fourth logic 638 may adapt how the second logic 634 controls the distribution of the curated electronic data based, at least in part, on data in the familiarity index. For example, the familiarity index may describe a likelihood that a courier apparatus will interact with a recipient apparatus and the fourth logic 638 may select couriers to deliver the curated electronic data based on the likelihoods of interactions between couriers and recipients.

Figure 7:
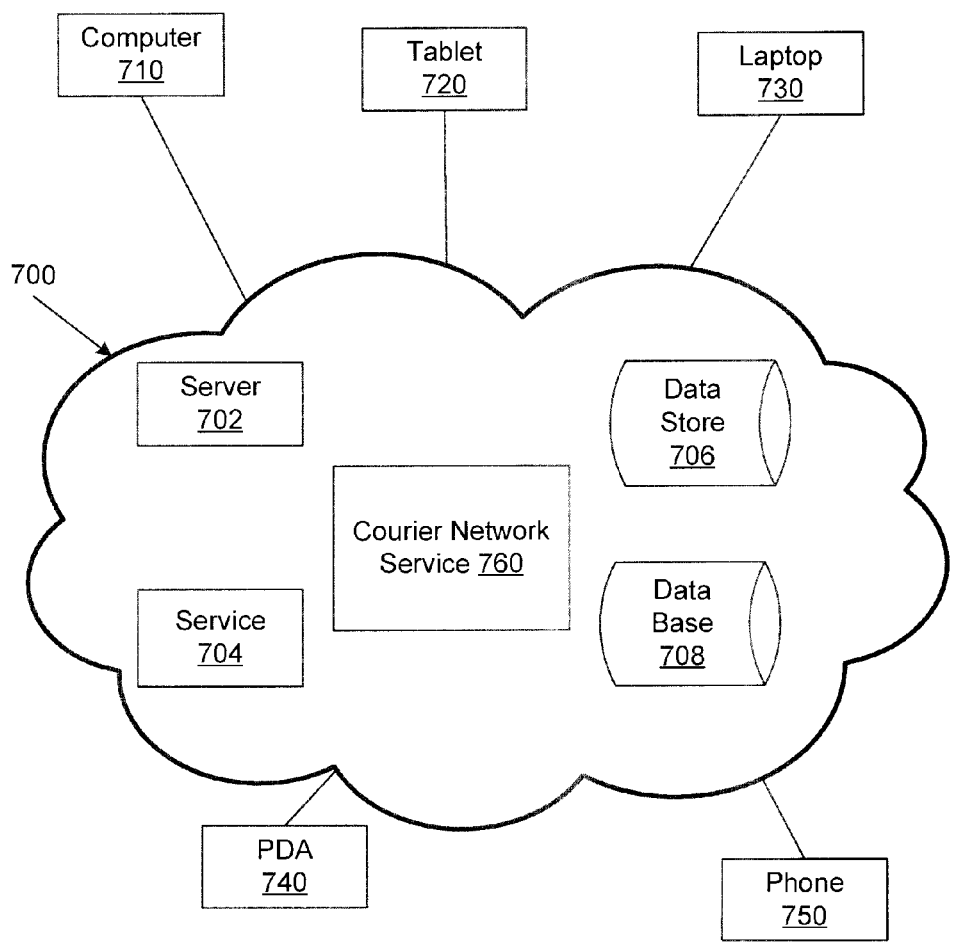
FIG. 7 illustrates an example cloud operating environment.

FIG. 7 illustrates an example cloud operating environment 700. A cloud operating environment 700 supports delivering computing, processing, storage, data management, applications, or other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways. Courier apparatus or recipient apparatus may interact with or have their actions controlled, at least in part, by courier network service 760.

FIG. 7 illustrates an example courier network service 760 residing in the cloud. The courier network service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud 700 and may, therefore, be used by the courier network service 760. At one point in time, a courier device may have access to courier network service 760 while a recipient device may not have direct access to the cloud 700 or courier network service 760. However, the recipient may gain some form of access to the courier network service 760 through messages, content, metadata, or other information that is physically transported to the recipient device by a courier device.

FIG. 7 illustrates various devices accessing the courier network service 760. The devices include a computer 710, a tablet 720, a laptop computer 730, a personal digital assistant 740, and a mobile device (e.g., cellular phone, satellite phone, wearable computing device) 750. The different devices may act as courier devices. The courier network service 760 may facilitate identifying curated electronic content to be provided to a courier device and identifying curated electronic content to be provided to a recipient device. The courier network service 760 may support different distribution models including request/response models, push models, and pull models that act autonomously, organically, or under some service or device-based control. The courier network service 760 may control how content is distributed by the courier network.

It is possible that different users at different locations using different devices may access the courier network service 760 through different networks or interfaces. In one example, the courier network service 760 may be accessed by a mobile device 750. The mobile device 750 may act as a courier in a courier network. In another example, portions of the courier network service 760 may reside on a mobile device 750. Thus, in one embodiment, devices that come in contact with mobile device 750 may gain access to at least a portion of the service 760 or be visible to the service 760.

Figure 8:
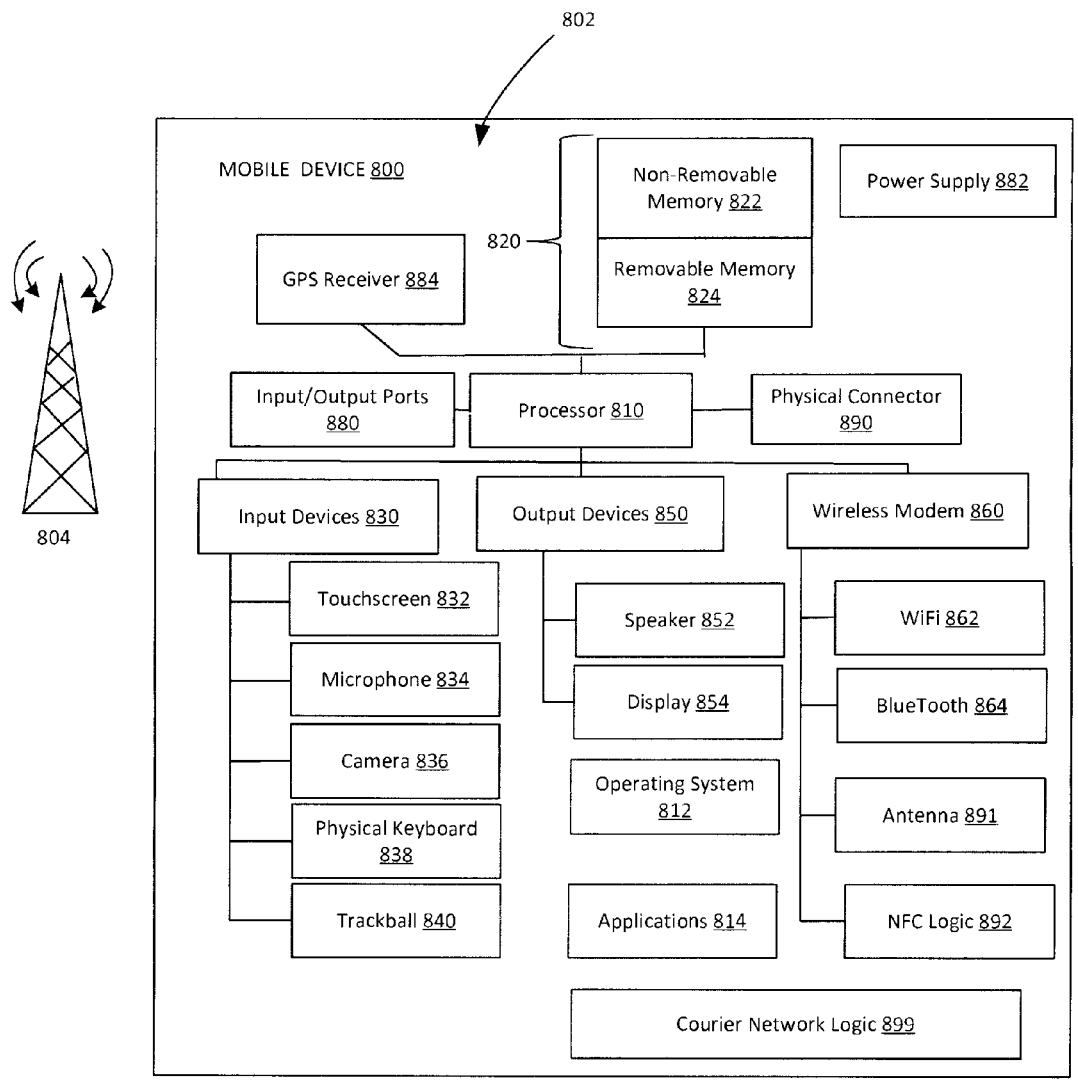
FIG. 8 is a system diagram depicting an exemplary mobile communication device.

FIG. 8 is a system diagram depicting an exemplary mobile device 800 that includes a variety of optional hardware and software components, shown generally at 802. In different embodiments, mobile device 800 may act as a courier device in a courier network or may provide a service for controlling content distribution in a courier network. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, etc.) and may allow wireless two-way communications with one or more mobile communications networks 804, such as a cellular or satellite network.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include content provider applications, recommendation applications, user activity applications, mobile computing applications (e.g., email applications, calendars, contact managers, web browsers, messaging applications), video games, or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include requests for content, content, metadata about available content, connectivity maps, reputation data, account data, prediction data, or other data. The memory 820 can be used to store a subscriber identifier, such as an International Mobile Subscriber Identity (IMSI), and an equipment identifier, such as an International Mobile Equipment Identifier (IMEI). In one example, the identifiers may be transmitted to a network server to identify users or equipment.

The mobile device 800 can support one or more input devices 830 including but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). A NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can include speech-recognition software as part of a voice user interface that allows a user to operate the device 800 via voice commands. Further, the device 800 can include input devices and software that allow for user interaction via a user's spatial gestures, such as detecting and interpreting gestures to provide input to a recommendation application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). NFC logic 892 facilitates having near field communications (NFC). Other short range communication protocols and device-to-device communications may be supported.

The mobile device 800 may include at least one input/output port 880, a power supply 882, a satellite navigation system receiver 884 such as a Global Positioning System (GPS) receiver, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a courier network logic 899 that provides a functionality for the mobile device 800. For example, the courier network logic 899 may provide a client for interacting with a service (e.g., service 760, FIG. 7) or may provide the service. Portions of the example methods described herein may be performed by the courier network logic 899. Similarly, the courier network logic 899 may implement portions of apparatus described herein.

In one embodiment, the courier network logic 899 may provide a content circuit that selects content to be carried in the memory of a courier apparatus operating in a direct network. Being a "direct" network means that some devices in the network communicate directly one-on-one with each other using, for example, NFC, rather than communicating indirectly through routers and other network apparatus using connections provided by the Internet or other network. The content is received from a data provider (e.g., electronic book store, operating system vendor, application vendor, video game store) and delivered to a second device (e.g., remote laptop) by a courier apparatus (e.g., smart phone carried by traveler). The content circuit selects the content based on content that is already stored in the direct network, data that is available to the network, and a distribution plan. For example, the content circuit may consider content already stored by the courier apparatus and content already stored by the second device before deciding what additional content to provide to the courier apparatus for potential delivery to the second device. The content circuit may also consider a distribution plan that describes content that is to be stored on the second device. For example, the distribution plan may identify an operating system and a service pack that an operating system vendor and manufacturer of mobile devices would prefer to have installed on devices. The content circuit may consider this plan when deciding what content (e.g., operating system, service pack) to provide to the courier apparatus for delivery to the second device.

Selecting the content to be distributed is just part of the work that may be performed by courier network logic 899. Courier network logic 899 may also include a connection circuit that controls communications in the direct network. For example, the connection circuit may control communications between the courier apparatus and the content provider and between the courier apparatus and the second device. Controlling communications may include identifying the content as only being allowed to be transferred over a certain type of communication link (e.g., Internet, not Internet). The connection circuit controls the communication of the content between the courier apparatus and the content provider at a first time at a first physical location using a first protocol while the courier apparatus is located at the first physical location. For example, while an owner of the courier apparatus (e.g., smart phone) is at work in the city the connection circuit may provide an update to a video game that is stored on other devices with which the courier apparatus may come in contact while at home in the suburbs. The connection circuit may then also control the communication of the content between the courier apparatus (e.g., smartphone) and the second device (e.g., laptop at home) at a second time at a second physical location using a second protocol while the courier apparatus is located at the second physical location. In this way, the content may be provided to the mobile device using a first type of link (e.g., high speed, low cost Internet) in a location with a first type of infrastructure and the content may be provided to the laptop and other devices using a second type of link (e.g., NFC) in a location with a second type of infrastructure. The second protocol may not involve the Internet and may be direct and connectionless.

Figure 9:
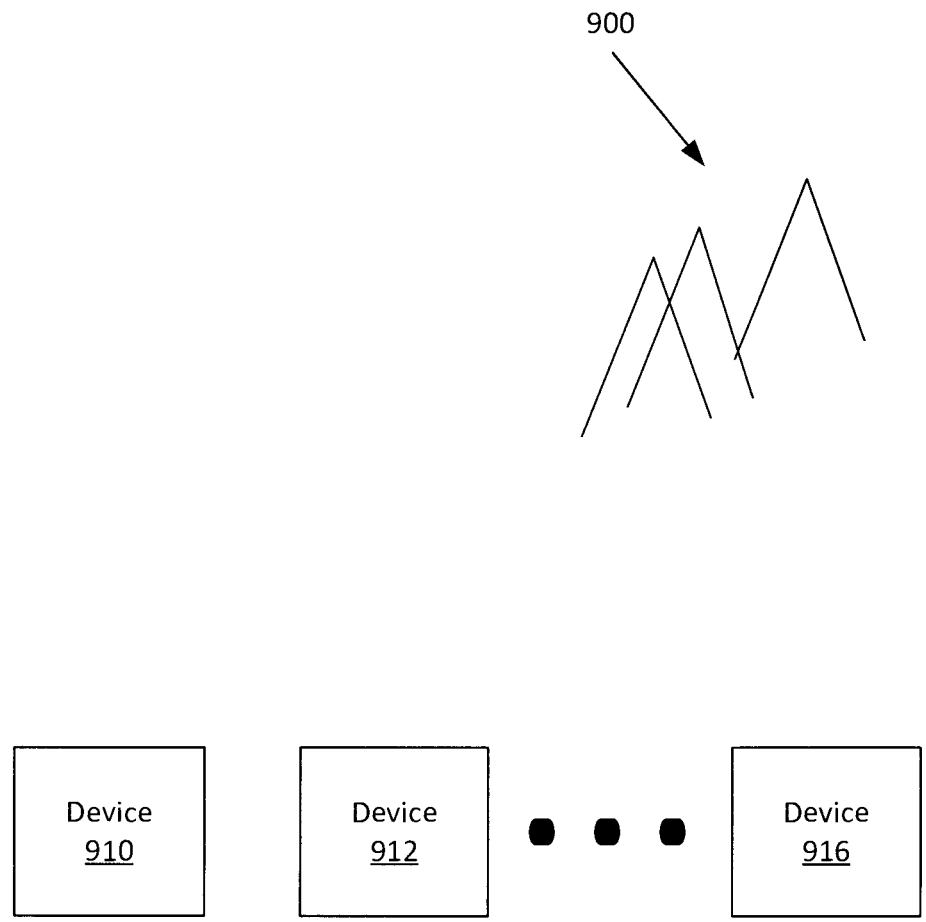
FIG. 9 illustrates a collection of example devices waiting for an example courier.

FIG. 9 illustrates a mountain range 900 and devices 910, and 912 through 916. The devices 910 through 916 may be able to communicate with each other but may not have any Internet connectivity. The devices 910-916 may participate in a courier network where messages, data, or other information is physically transported by a courier device.

Figure 10:
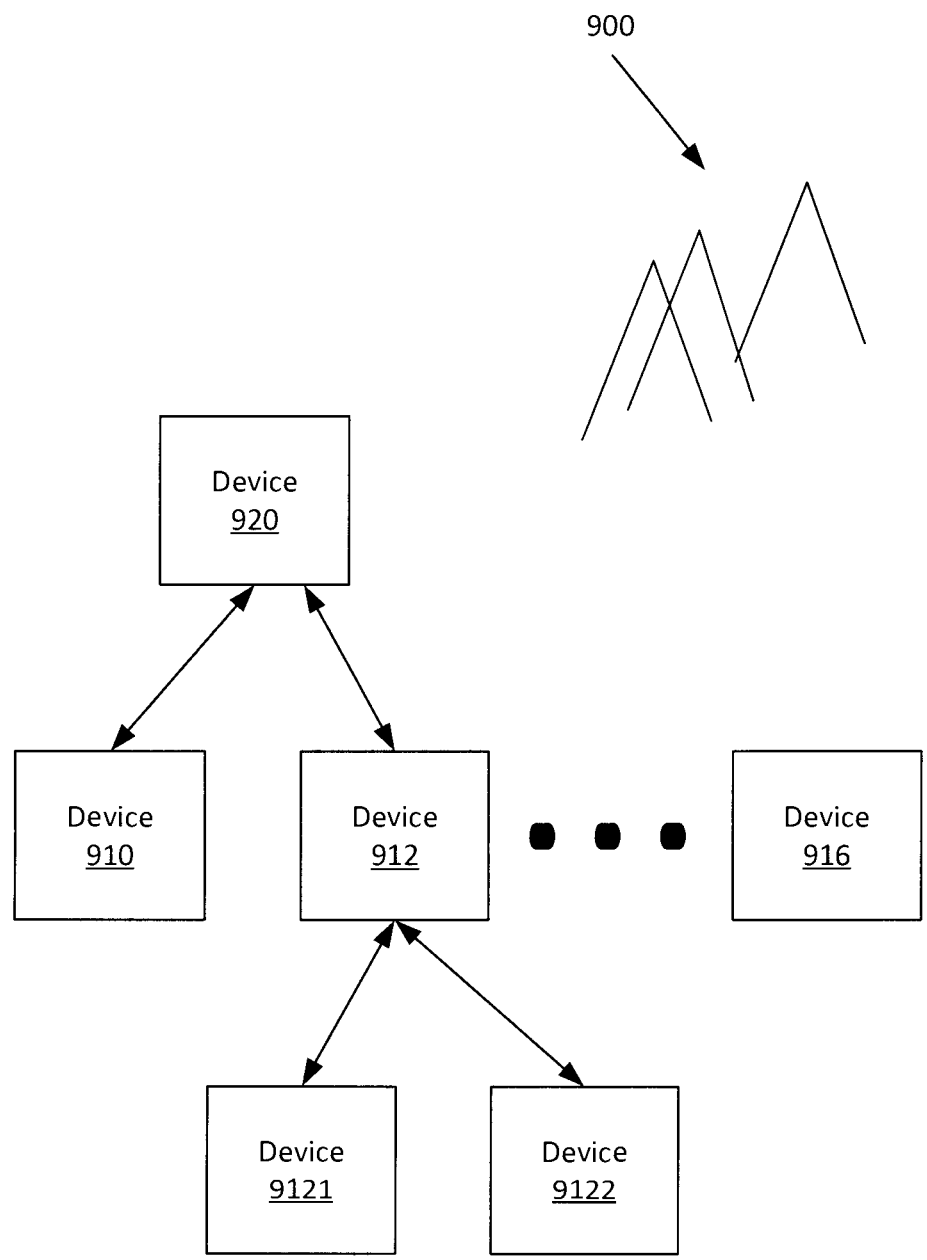
FIG. 10 illustrates a collection of example devices after an example courier has arrived.

FIG. 10 illustrates mountain range 900 and a different set of devices. In addition to devices 910 and 912 through 916, a device 920 is present as are devices 9121 and 9122. Device 920 may be acting as a courier device. Device 920 may have brought electronic content over the mountains 900. Device 920 may have specific electronic content that was previously requested by a device, or may have information about electronic content that is available on the other side of the mountains 900. Device 920 may provide content or metadata to device 910. Device 920 may also provide content or metadata to device 912. Device 912 may then in turn provide content or metadata to devices 9121 and 9122. While in range of the devices 910 through 916, device 920 may receive requests for content. The requests may come directly (e.g., from device 910) or may come indirectly (e.g., from device 9121 via device 912). The content available in device 920 may have been selected by a service provided by example apparatus and methods. Additionally, the way in which content is made available from device 920 may be controlled by a service provided by example apparatus and methods.

"Computer-readable storage medium", as used herein, refers to a medium that stores instructions or data. "Computer-readable storage medium" does not refer to propagated signals, per se. A computer-readable storage medium may take forms, including, but not limited to, non-volatile media, and volatile media. Non-volatile media may include, for example, optical disks, magnetic disks, tapes, flash memory, read only memory (ROM), and other media. Volatile media may include, for example, semiconductor memories, dynamic memory (e.g., dynamic random access memory (DRAM), synchronous dynamic random access memory (SDRAM), double data rate synchronous dynamic random-access memory (DDR SDRAM), etc.), and other media. Common forms of a computer-readable storage medium may include, but are not limited to, a floppy disk, a flexible disk, a hard disk, a magnetic tape, other magnetic medium, a compact disk (CD), a random access memory (RAM), a read only memory (ROM), a memory chip or card, a memory stick, and other media from which a computer, a processor or other electronic device can read.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store electronic data. A data store may be, for example, a database, a table, a file, a list, a queue, a heap, a memory, a register, and other physical repository. In different examples, a data store may reside in one logical or physical entity or may be distributed between two or more logical or physical entities. Storing electronic data in a data store causes a physical transformation of the data store.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, and C, (e.g., the data store may store only A, only B, or only C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . ABB . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof including multiple instances of A, B, or C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a processor;
   a set of logics that control the distribution of curated electronic data in a courier network;
   a memory that stores information for controlling the distribution of the curated electronic data in the courier network; and
   an interface to connect the processor, the memory, and the set of logics;
   the set of logics comprising:
   a first logic that identifies the curated electronic data; and
   a second logic that controls the distribution of the curated electronic data in the courier network,
   where the courier network includes a recipient apparatus and a courier apparatus,
   where the courier apparatus receives the curated electronic data from a content provider at a first physical location at a first point in time as controlled, at least in part, by the second logic,
   where the curated electronic is carried to a second physical location by the courier apparatus, and
   where the courier apparatus provides the curated electronic data to the recipient apparatus at the second physical location at a second later point in time as controlled, at least in part, by the second logic.

2. The apparatus of claim 1, where the first logic identifies the curated electronic data based on information about the recipient apparatus, where the information about the recipient apparatus describes a state of the recipient apparatus.

3. The apparatus of claim 2, where the first logic identifies the curated electronic data based, at least in part, on the state of the recipient apparatus as compared to a desired state for the recipient apparatus.

4. The apparatus of claim 2, where the information about the recipient apparatus originated in the recipient apparatus and describes the state of the recipient apparatus, a request provided by the recipient apparatus, a notice of content received by the recipient apparatus, or a license parameter associated with the recipient apparatus.

5. The apparatus of claim 2, where the information about the recipient apparatus originated in the courier apparatus and describes the state of the recipient apparatus, a request provided by the recipient apparatus, a notice of content received by the recipient apparatus, or a license parameter associated with the recipient apparatus.

6. The apparatus of claim 2, where the information about the recipient apparatus originated in the apparatus and describes an account parameter associated with the recipient apparatus, a reputation parameter associated with the recipient apparatus, or a license parameter associated with the recipient apparatus.

7. The apparatus of claim 1, where the curated electronic data is an operating system, an operating system update, an application, an application update, a piece of content, an update to a piece of content, or an encryption key.

8. The apparatus of claim 1, where the first logic identifies the curated electronic data based on information transferred in two or more request/response iterations between the recipient apparatus and the content provider, where a request/response iteration involves couriering a request from the recipient apparatus to the content provider and couriering a response from the content provider to the recipient apparatus.

9. The apparatus of claim 1, where the first logic identifies the curated electronic data based on a prediction of content that will satisfy a utility measure for the recipient apparatus.

10. The apparatus of claim 9, where the prediction is based, at least in part, on a state of the recipient apparatus.

11. The apparatus of claim 9, where the prediction is based, at least in part, on a an analysis of the state of the recipient apparatus made by a recommendation system.

12. The apparatus of claim 9, where the prediction is based, at least in part, on content that was acquired from the courier apparatus by other recipient apparatus within a threshold period of time.

13. The apparatus of claim 9, where the prediction is based, at least in part, on content that was acquired from the content provider within a threshold period of time.

14. The apparatus of claim 9, where the prediction is based on content that has been acquired by the content provider since a previous interaction with the recipient apparatus.

15. The apparatus of claim 1, where the first logic provides an estimated delivery time for the curated electronic data or an estimated delivery cost for the curated electronic data, and where the second logic selectively controls whether or how the curated electronic data is distributed based, at least in part, on the estimated delivery time or the estimated delivery cost.

16. The apparatus of claim 1, where the first logic assigns an expiration time to the curated electronic data and where the second logic controls the distribution of the curated electronic data based, at least in part, on the expiration time.

17. The apparatus of claim 16, where, upon determining that the expiration time has passed, the second logic selectively causes the curated electronic data to be deleted from the memory of the courier apparatus or selectively prevents the curated electronic data from being distributed by the courier apparatus.

18. The apparatus of claim 1, where, upon determining that the curated electronic data has already been received by an intended recipient apparatus, the second logic selectively causes the curated electronic data to be deleted from the memory of the courier apparatus.

19. The apparatus of claim 1, where the second logic controls the distribution of the curated electronic data by selecting a selected courier apparatus to which the curated electronic data will be provided.

20. The apparatus of claim 19, where the second logic selects the selected courier apparatus based, at least in part, on a cost associated with couriering the curated electronic data in the selected courier apparatus, on a security associated with couriering the curated electronic data in the selected courier apparatus, or on an expected delivery time associated with couriering the curated electronic data in the selected courier apparatus.

21. The apparatus of claim 19, where the second logic selects the selected courier apparatus based, at least in part, on a number of courier apparatus that have already been provided with the curated electronic data.

22. The apparatus of claim 1, where the second logic controls the distribution of the curated electronic data by identifying a number of courier apparatus to which the curated electronic data will be provided.

23. The apparatus of claim 22, where the number of courier apparatus to which the curated electronic data will be provided is based, at least in part, on an urgency measure associated with the curated electronic data, or on a breadth of distribution measure associated with the curated electronic data.

24. The apparatus of claim 1, where the second logic controls the distribution of the curated electronic data by selecting a communication channel for providing the curated electronic data from the content provider to the courier apparatus.

25. The apparatus of claim 24, where the communication channel is selected based, at least in part, on a cost associated with transferring the curated electronic data on the communication channel, on a security associated with transferring the curated electronic data on the communication channel, on a bandwidth associated with transferring the curated electronic data on the communication channel, or on an expected completion time associated with transferring the curated electronic data on the communication channel.

26. The apparatus of claim 1, where the second logic controls the distribution of the curated electronic data by selecting a communication channel for providing the curated electronic data from the courier apparatus to the recipient apparatus.

27. The apparatus of claim 26, where the communication channel is selected based, at least in part, on a cost associated with transferring the curated electronic data on the communication channel, on a security associated with transferring the curated electronic data on the communication channel, on a bandwidth associated with transferring the curated electronic data on the communication channel, or on an expected completion time associated with transferring the curated electronic data on the communication channel.

28. The apparatus of claim 1,
where the second logic controls a security level associated with transferring the curated electronic data from the content provider to the courier apparatus, or
where the second logic controls a security level associated with transferring the curated electronic data from the courier apparatus to the recipient apparatus.

29. The apparatus of claim 1, where the second logic provides time data to a user of the courier apparatus describing a period of time needed to complete a transfer of targeted electronic content to the courier apparatus.

30. The apparatus of claim 1, where the second logic controls the distribution of the curated electronic data by selectively causing a request for content from the recipient apparatus to be accepted by the content provider based, at least in part, on an account status associated with the recipient apparatus, on a reputation status associated with the recipient apparatus, or on information concerning other curated electronic data previously distributed to the courier network.

31. The apparatus of claim 30, where the second logic selectively updates the account status associated with the recipient apparatus or the reputation status associated with the recipient apparatus.

32. The apparatus of claim 1, where the second logic controls the distribution of the curated electronic data to maximize profit produced for the content provider, to maximize throughput to the recipient apparatus, to maximize a distribution area for the curated electronic data, or to minimize a cost for distributing the curated electronic data.

33. The apparatus of claim 1, where the second logic controls the distribution of the curated electronic data by deciding whether to provide actual curated electronic data or metadata about the curated electronic data.

34. The apparatus of claim 1, comprising a third logic that provides a user interface that displays a number of courier apparatus available to distribute the curated electronic data, an expected number of courier apparatus available to distribute the curated electronic data, information concerning communication channels available to distribute the curated electronic data, a likelihood of an interaction between a certain courier apparatus and a certain recipient apparatus, a number of recipient apparatus likely to be encountered by the courier apparatus, an actual coverage of the courier network by the curated electronic data, or a predicted coverage of the courier network by the curated electronic data.

35. The apparatus of claim 1, comprising a fourth logic that provides a familiarity index that relates one or more courier apparatus in the courier network to one or more recipient apparatus in the courier network, where the familiarity index describes how often a recipient apparatus interacts with a courier apparatus, an amount of data transferred from a courier apparatus to a recipient apparatus, and a type of data transferred from a courier apparatus to a recipient apparatus.

36. The apparatus of claim 35, where the fourth logic adapts how the second logic controls the distribution of the curated electronic data based, at least in part, on data in the familiarity index.

37. The apparatus of claim 35, where the familiarity index describes a likelihood that a courier apparatus will interact with a recipient apparatus, and where the fourth logic controls delivery of the curated electronic data based on the likelihoods of interactions between couriers and recipients.

38. A method, comprising:
identifying curated electronic data to be couriered between a data provider and a data recipient by a courier device in a courier network, where the curated electronic data is identified based, at least in part, on state provided by the data recipient, on state provided by the courier device, on state provided by the data provider, and on a distribution plan for the courier network;
controlling a first electronic interaction between the courier device and the data provider, where the first electronic interaction occurs at a first time using a first communication path while the courier device is located in a first location; and
controlling a second electronic interaction between the courier device and the data recipient, where the second electronic interaction occurs at a second later time using a second different communication path while the courier device is located in a second different location,
where the first electronic interaction selectively transfers the curated electronic data from the data provider to the courier device,
where the second electronic interaction selectively transfers the curated electronic data from the courier device to the data recipient,
where the first electronic interaction and the second electronic interaction are performed independently and separated by at least one minute, and
where the method is performed by an apparatus other than the courier device or the data recipient.

39. The method of claim 38, where the first location is at least one kilometer from the second location, where the second time is at least one hour after the first time, and where the second communication path does not include the Internet.

40. The method of claim 38, where the state provided by the data recipient, by the courier device, or by the data provider identifies an operating system on the data recipient, an application on the data recipient, or a piece of data on the data recipient.

41. The method of claim 40, where the distribution plan describes a current distribution of content in the courier network, a desired distribution of content in the courier network, a predicted distribution of content in the courier network, and a distribution urgency for selected content in the courier network.

42. The method of claim 40, where identifying the curated electronic data includes identifying an update to the operating system, identifying a replacement to the operating system, identifying an update to the application, identifying a replacement for the application, identifying an update to the piece of data, or identifying derivative data based on the piece of data.

43. The method of claim 41, the method comprising producing a familiarity index that describes interactions between data recipients, data providers, and courier devices.

44. The method of claim 43, comprising selecting a number of courier apparatus to which the curated electronic data is to be provided based on the familiarity index and the distribution plan.

45. The method of claim 43, comprising selecting which courier apparatus are to distribute the curated electronic data based, at least in part, on the familiarity index and the distribution plan.

46. The method of claim 41, comprising selecting the curated electronic data based on a reputation associated with a courier device, a reputation associated with a data recipient, a license parameter associated with a courier device, a license parameter associated with a data recipient, an account parameter associated with a courier device, or an account parameter associated with a data recipient.

47. An apparatus, comprising:
- a memory;
- a content circuit that selects content to be carried in the memory of a courier apparatus operating in a direct network, where the content is received from a data provider and delivered to a second device by the courier apparatus,
- where the content circuit selects the content based on content stored by the courier apparatus, content stored by the second device, and a distribution plan for the direct network, where the distribution plan describes content that is to be stored on the second device; and
- a connection circuit that controls communications in the direct network between the courier apparatus and the content provider and between the courier apparatus and the second device,
- where the connection circuit controls the communication of the content between the courier apparatus and the content provider at a first time at a first physical location using a first protocol while the courier apparatus is located at the first physical location,
- where the connection circuit controls the communication of the content between the courier apparatus the second device at a second time at a second physical location using a second protocol while the courier apparatus is located at the second physical location,
- where the second protocol does not involve the Internet, and
- where the second protocol is connectionless.

* * * * *